US009800596B1

(12) United States Patent
Chiles

(10) Patent No.: US 9,800,596 B1
(45) Date of Patent: Oct. 24, 2017

(54) AUTOMATED DETECTION OF TIME-BASED ACCESS ANOMALIES IN A COMPUTER NETWORK THROUGH PROCESSING OF LOGIN DATA

(71) Applicant: EMC Corporation, Hopkinton, MA (US)

(72) Inventor: Richard Chiles, Castro Valley, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 100 days.

(21) Appl. No.: 14/869,354

(22) Filed: Sep. 29, 2015

(51) Int. Cl.
*H04L 29/06* (2006.01)
*H04L 29/08* (2006.01)

(52) U.S. Cl.
CPC .......... *H04L 63/1416* (2013.01); *H04L 63/08* (2013.01); *H04L 63/105* (2013.01); *H04L 63/1425* (2013.01); *H04L 67/306* (2013.01)

(58) Field of Classification Search
CPC ... H04L 63/08; H04L 63/105; H04L 63/1416; H04L 63/1425; G06F 21/316; G06F 21/554; G06F 21/552; G06F 21/55
See application file for complete search history.

(56) References Cited

U.S. PATENT DOCUMENTS

| | | | |
|---|---|---|---|
| 6,405,318 B1 * | 6/2002 | Rowland | G06F 21/552 726/22 |
| 6,505,039 B1 | 1/2003 | Boatwright | |
| 8,272,033 B2 * | 9/2012 | Wasmund | G06F 21/316 726/2 |
| 9,148,424 B1 * | 9/2015 | Yang | H04L 63/083 |

(Continued)

FOREIGN PATENT DOCUMENTS

| | | |
|---|---|---|
| CN | 101349987 A | 1/2009 |
| JP | 2002297543 A | 10/2002 |

(Continued)

OTHER PUBLICATIONS

Dorothy E. Denning, "An Intrusion-Detection Model," IEEE Transactions on Software Engineering, Feb. 1987, pp. 222-232, vol. SE-13, No. 2.
Jesse Hoey, "Two-Way Likelihood Ration (G) Test and Comparison to Two-Way Chi Squared Test," arXiv, 1206.4881v2, Jun. 27, 2012, 6 pages.
RSA Security Analytics, "Detect & Investigate Threats." Data Sheet, Oct. 2013, 6 pages.

(Continued)

*Primary Examiner* — Tri Tran
(74) *Attorney, Agent, or Firm* — Ryan, Mason & Lewis, LLP

(57) ABSTRACT

A processing device comprises a processor coupled to a memory and is configured to obtain data characterizing login events for multiple user identifiers. The data associated with a given one of the user identifiers is processed to generate a login profile for a corresponding user, and likelihood statistics are generated for respective ones of multiple time bins based on the login profile. Data characterizing one or more additional login events for the given user identifier is obtained, and a confidence measure is generated for a given one of the additional login events based on one or more of the likelihood statistics and a time bin associated with the given additional login event. The confidence measure is compared to a threshold and an alert relating to the given additional login event is generated and transmitted to a security agent. The processing device may be implemented in a network security system.

22 Claims, 4 Drawing Sheets

(56) References Cited

U.S. PATENT DOCUMENTS

| | | | |
|---|---|---|---|
| 2007/0300300 A1* | 12/2007 | Guo | ............... G06F 21/552 726/23 |
| 2008/0162338 A1 | 7/2008 | Samuels et al. | |
| 2014/0230051 A1* | 8/2014 | Vallinayagam | ..... H04L 63/1416 726/22 |
| 2015/0161394 A1 | 6/2015 | Ferragut et al. | |

FOREIGN PATENT DOCUMENTS

| | | |
|---|---|---|
| JP | 2005301928 A | 10/2005 |
| WO | 2015043491 A1 | 4/2015 |

OTHER PUBLICATIONS

Y. Wang, "A Multinomial Logistic Regression Modeling Approach for Anomaly Intrusion Detection," Computers and Security, Nov. 2005, pp. 662-674, vol. 24, No. 8.

D. Canali et al., "On the Effectiveness of Risk Prediction Based on Users Browsing Behavior," Proceedings of the 9th ACM Symposium on Information, Computer and Communications Security, Jun. 2014, pp. 171-182.

Y. Carlinet et al., "Analysis of Computer Infection Risk Factors Based on Customer Network Usage," Proceedings of the Second International Conference on Emerging Security Information, Systems and Technologies (SECURWARE), Aug. 2008, pp. 317-325, Cap Esterel, France.

\* cited by examiner

FIG. 4

```
--T_current is the timestamp being tested.
--nStamps the number of timestamps in the history.
--T[k] is the timestamp history for the userId.  k ranges from
1 to nStamps.  T[k] is sorted in temporal order.
--The timestamp is in seconds.
--S[i] is a histogram.  i ranges from 1 to 24.

-- Calculate histogram for UserId
for k ranging between 1 and nStamps
   secondInDay = T[k] modulo numberSecondsInDay
   hourInDay = secondInDay/numSecondsInHour
   S[hourInDay] += 1

--   Calculate statistic for each hour
for i ranging between 1 and 24
   T[i] = S[i]*log(S[i]) - (S[i]+1)*log(S[i]+1)
   T[i] += (nStamps+1)*log(nStamps+1) - nStamps*log(nStamps)

-- Get hour for current timestamp
secondInDay = T_current modulo numberSecondsInDay
hour_current = secondInDay/numSecondsInHour -- Calculate the p-Value by summing probabilities for all
statistics less than or equal to the current hour.
-- lambda is adjustable. Typically a value between 0 to .6
for i ranging between 1 and 24
   if( T[i] >= T[hour_current] ) then pVal +=
(S[i]+lambda)/(nStamps+24*lambda)

-- Add T_current to T[].
if(nStamp < maxStamps)
     T[nStamp+1] = T_current
     nStamp += 1
else
   for k ranging from 1 to nStamp-1
     T[k] = T[k+1]
   T[nStamp] = T_current -- Send alert if above threshold
if( -log(pVal)>threshold) then send Alert
```

AUTOMATED DETECTION OF TIME-BASED ACCESS ANOMALIES IN A COMPUTER NETWORK THROUGH PROCESSING OF LOGIN DATA

FIELD

The field relates generally to computer networks, and more particularly to techniques for providing security in a computer network.

BACKGROUND

Computer networks are often configured to incorporate network security systems in order to protect the networks against malicious activity. Such malicious activity can include, for example, fraudulent access attempts made by human users or possibly by networks of compromised computers or "botnets."

Network security systems can be designed to protect a computer network of a company, organization or other large enterprise comprising many thousands of user devices. However, enterprise computer networks are in many cases continuously growing in size, and often incorporate a diverse array of user devices, including mobile telephones, laptop computers and tablet computers. This continuous growth can make it increasingly difficult to provide a desired level of protection using the limited resources of the network security system. For example, available network security system functionality such as processing of security alerts and deployment of attack remediation measures on user devices can be strained by the demands of large enterprise networks.

Moreover, recent years have seen the rise of increasingly sophisticated attacks including advanced persistent threats (APTs) which can pose severe risks to enterprises. These APTs are typically orchestrated by well-funded attackers using advanced tools to adapt to the victim environment while maintaining low profiles of activity. As a result, traditional defenses deployed by enterprise network security systems today often fail at detecting and remediating access anomalies at a sufficiently early stage.

SUMMARY

Illustrative embodiments of the invention provide techniques for automated detection of time-based access anomalies in a computer network. Such an arrangement in some embodiments advantageously permits a network security system to focus its efforts on particular ones of its user devices that are most likely to be subject to login attacks.

Accordingly, the limited resources of the network security system available for login attack detection and remediation can be more intelligently and effectively deployed in the computer network, resulting in improved performance as well as enhanced security against APTs and other types of attacks.

In one embodiment, a processing device comprises a processor coupled to a memory and is configured to obtain data characterizing login events for a plurality of user identifiers. The login events are associated with respective logins initiated from user devices over at least one network. The data associated with a given one of the user identifiers is processed to generate a login profile for a corresponding user, and likelihood statistics are generated for respective ones of a plurality of time bins based on the login profile. Data characterizing one or more additional login events for the given user identifier is obtained, and a confidence measure is generated for a given one of the additional login events based on one or more of the likelihood statistics and a time bin associated with the given additional login event. The confidence measure is compared to a threshold and an alert relating to the given additional login event is generated. The alert is transmitted over said at least one network to a security agent.

A given processing device configured with functionality for automatic detection of time-based access anomalies may be implemented, for example, in one or more network devices of a computer network, or in a security analytics system or other type of network security system associated with the computer network.

These and other illustrative embodiments include, without limitation, methods, apparatus, networks, systems and processor-readable storage media.

BRIEF DESCRIPTION OF THE DRAWINGS

FIG. 4 shows pseudocode of an example of real-time processing of a given login event in the FIG. 3 system.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
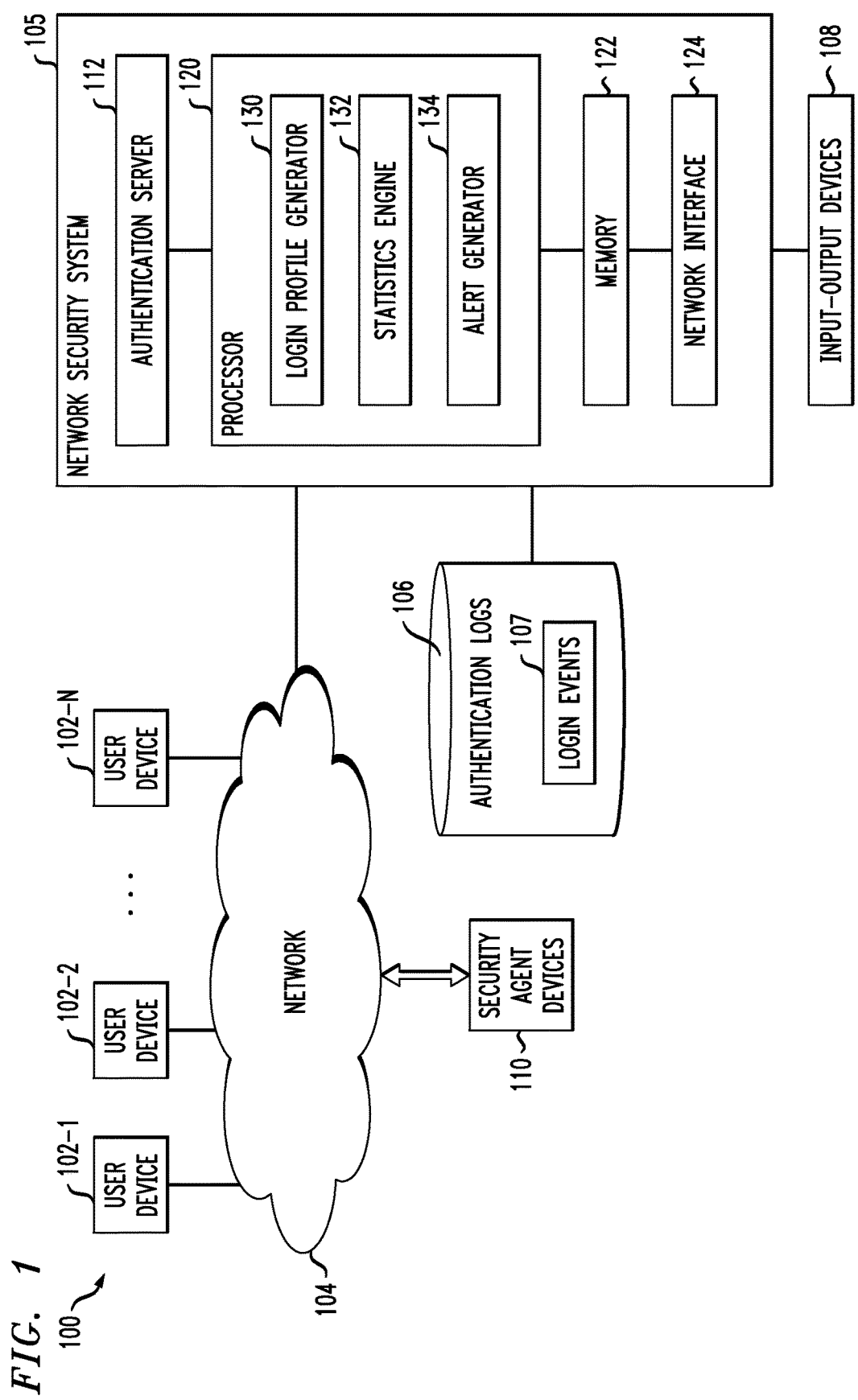
FIG. 1 is a block diagram of a computer network configured for automated detection of time-based access anomalies through processing of data characterizing login events in an illustrative embodiment of the invention.

FIG. 1 shows a computer network 100 configured in accordance with an illustrative embodiment of the invention. The computer network 100 comprises a plurality of user devices 102-1, 102-2, . . . 102-N, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is a network security system 105.

The user devices 102 may comprise, for example, mobile telephones, laptop computers, tablet computers, desktop computers or other types of devices capable of supporting user logins, in any combination. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

The network 104 is assumed to comprise a global computer network such as the Internet, although other types of networks can be part of the computer network 100, including a wide area network (WAN), a local area network (LAN), a satellite network, a telephone or cable network, a cellular network, a wireless network such as a WiFi or WiMAX network, or various portions or combinations of these and other types of networks. The computer network 100 in some embodiments therefore comprises combinations of multiple different types of networks each comprising processing devices configured to communicate using IP or other related communication protocols.

The network security system 105 has an associated database 106 configured to store authentication logs. The authentication logs database 106 more particularly stores authentication logs comprising login events 107, although additional or alternative logs may be used in other embodiments. Data such as timestamps and other information associated with the login events 107 is also referred to herein as "login data."

The authentication logs database 106 in the present embodiment is implemented using one or more storage devices associated with the network security system 105. Such storage devices may comprise, for example, storage products such as VNX® and Symmetrix VMAX®, both commercially available from EMC Corporation of Hopkinton, Mass. A variety of other storage products may be utilized to implement at least a portion of the storage devices associated with the network security system 105.

The login events 107 illustratively comprise respective timestamps and other information characterizing successful logins processed in conjunction with users attempting to access protected resources of the computer network 100 via the user devices 102. Other types of login events may be used in other embodiments.

Also associated with the network security system 105 are input-output devices 108, which illustratively comprise keyboards, displays or other types of input-output devices in any combination. Such input-output devices are used to support one or more user interfaces to the network security system 105, as well as to support communication between the network security system 105 and other related systems and devices not explicitly shown.

In the present embodiment, alerts generated by the network security system 105 are provided over the network 104 to one or more security agent devices 110. Such devices, like the user devices 102, can illustratively comprise mobile telephones, laptop computers, tablet computers, desktop computers, or other types of computers or processing devices configured for communication over network 104 with the network security system 105. For example, a given security agent device can comprise a mobile telephone equipped with a mobile application configured to receive alerts from the network security system 105 and to provide an interface for a security agent to select particular remedial measures for responding to the alert. Examples of such remedial measures may include logging off the user device in question, or requiring various additional authentication factors for subsequent access attempts made from the user device in question.

It should be noted that a "security agent" as the term is generally used herein may comprise an automated entity, such as a software entity running on a processing device. Accordingly, a security agent need not be a human entity.

The network security system 105 comprises an authentication server 112. Login events initiated at respective ones of the user devices 102 are directed to the authentication server 112 over the network 104 for processing. The authentication server 112 determines if a given access attempt is authentic based on presentation of one or more predetermined authentication factors such as user identifiers, passwords or other factors. Upon verification of the presented authentication factors, the authentication server 112 grants the requesting user device 102 access to one or more protected resources of the computer network 100. Although shown as an element of the network security system 105 in this embodiment, the authentication server 112 in other embodiments can be implemented at least in part externally to the network security system 105, for example, as a stand-alone server, set of servers or other type of authentication system coupled to the network 104.

In the FIG. 1 embodiment, a successful access attempt is assumed to represent a login event for the corresponding user identifier and is logged in the authentication logs database 106 as one of the login events 107. Other types of authentication mechanisms and associated login events can be used in other embodiments.

The network security system 105 in the FIG. 1 embodiment is assumed to be implemented using at least one processing device. Each such processing device generally comprises at least one processor and an associated memory, and implements one or more functional modules for controlling certain features of the network security system 105.

More particularly, the network security system 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the network security system 105 to communicate over the network 104 with the user devices 102 and the security agent devices 110, and illustratively comprises one or more conventional transceivers.

The processor 120 further comprises a login profile generator 130, a statistics engine 132 and an alert generator 134. The login profile generator 130 is configured to obtain data characterizing login events for a plurality of user identifiers and to process the data associated with the user identifiers to generate respective login profiles for corresponding users. As noted above, the login events are assumed to be associated with respective logins initiated from user devices 102 over the network 104, although additional or alternative types of login events could be processed in other embodiments. The processed login events illustratively include at least a subset of the login events 107 stored in the authentication logs database 106, although login events can be captured and stored for subsequent processing in the network security system 105 of the computer network 100 in other ways.

The statistics engine 132 is configured to generate likelihood statistics for each of the login profiles. The likelihood statistics for a given one of the login profiles are generated for respective ones of a plurality of time bins based on that login profile. The statistics engine 132 also obtains data characterizing one or more additional login events for a particular one of the user identifiers, and generates a confidence measure for a given one of the additional login events based on one or more of the likelihood statistics and a time bin associated with the given additional login event.

The alert generator 134 is configured to compare the confidence measure to a threshold, and to generate an alert relating to the given additional login event based on a result of the comparison. The alert in the present embodiment is assumed to be transmitted via the network interface 124 over the network 104 to a security agent associated with one of the security agent devices 110.

Additional description regarding more detailed examples of likelihood statistics, confidence measures and comparison thresholds that are used in illustrative embodiments will be provided below.

The arrangement described above advantageously permits the network security system 105 to focus its efforts on the particular ones of the user devices 102 that are most likely to be subject to login attacks. Accordingly, the limited resources of the network security system 105 available for login attack detection and remediation can be more intelligently and effectively deployed in the computer network 100, resulting in improved performance as well as enhanced security against APTs and other types of attacks.

It is to be appreciated that this particular arrangement of modules 130, 132 and 134 illustrated in the processor 120 of the FIG. 1 embodiment is presented by way of example only, and alternative arrangements can be used in other embodiments. For example, the functionality associated with the modules 130, 132 and 134 in other embodiments can be combined into a single module, or separated across a larger number of modules. As another example, multiple distinct processors can be used to implement different ones of the modules 130, 132 and 134 or portions thereof.

At least portions of the login profile generator 130, statistics engine 132 and alert generator 134 may be implemented at least in part in the form of software that is stored in memory 122 and executed by processor 120. Similarly, at least portions of the authentication server 112 of the network security system 105 can be implemented at least in part in the form of software that is stored in memory 122 and executed by processor 120.

It is to be understood that the particular set of elements shown in FIG. 1 for automatically detecting time-based access anomalies involving user devices 102 of computer network 100 and automatically implementing remedial measures based on the detected time-based access anomalies is presented by way of illustrative example only, and in other embodiments additional or alternative elements may be used. Thus, another embodiment may include additional or alternative systems, devices and other network entities, as well as different arrangements of modules and other components.

By way of example, in other embodiments, the network security system 105 can be eliminated and associated elements such as authentication server 112, login profile generator 130, statistics engine 132 and alert generator 134 can be implemented elsewhere in the computer network 100.

In some embodiments, the network security system 105 is a part of or otherwise associated with another system, such as, for example, a security operations center (SOC) or a critical incident response center (CIRC).

Additionally or alternatively, the network security system 105 can be part of or incorporate an otherwise conventional security analytics system, such as the RSA Security Analytics system commercially available from RSA, The Security Division of EMC Corporation of Hopkinton, Mass.

Other embodiments can implement the network security system 105 and its associated authentication server 112 as part of or in conjunction with a security information and event management (SIEM) system, such as the enVision® platform, also commercially available from RSA. Such an SIEM system is also considered another possible example of a "network security system" as that term is broadly used herein. In an embodiment of this type, at least portions of the authentication logs stored in the database 106 illustratively comprise security logs collected by the SIEM system.

An exemplary process utilizing login profile generator 130, statistics engine 132 and alert generator 134 of the network security system 105 in computer network 100 will now be described in more detail with reference to the flow diagram of FIG. 2. It is to be understood that this particular process is only an example, and additional or alternative processes can be carried out in other embodiments.

In this embodiment, the process includes steps 200 through 210. These steps are assumed to be performed by the processor 120 utilizing its modules 130, 132 and 134.

In step 200, data characterizing login events for a plurality of user identifiers is obtained. The login events are assumed to be associated with respective logins initiated from user devices 102 over the network 104. For example, at least a portion of the data can be obtained from the database 106. The data characterizing the login events for the multiple users is processed to generate login profiles for respective corresponding users.

Users tend to have regular work hours, and it is during these work hours that they typically login into the computer network 100. However, the work hours and login times vary from user to user. There are certain times when a given user is most likely to login (e.g., the start of the work day) and other times when logins by that user are very rare (e.g., late evenings). Accordingly, the login profile can be obtained for the user corresponding to a given user identifier by observing the login event times for that user identifier over an extended period of time. The login profile is established in some embodiments based on counts of the number of login events that fall into each of 24 possible hourly time bins of a day. For example, the login profile can measure the number of login events for each of the 24 hourly time bins during a two week period or other extended period of time.

In step 202, for each login profile, likelihood statistics are generated for respective time bins based on the login profile. For example, the login profile for a given user identifier in some embodiments comprises login event counts for respective ones of the time bins with the login event counts indicating for the corresponding user how many login events fall into each of the time bins. As noted above, the time bins in some embodiments illustratively comprise respective hours of a day, such that there are 24 time bins, one for each hour. In such an arrangement, the login profile for the given user identifier illustratively comprises login event counts $S_i$ denoting the number of login events for hourly time bin i, where the index i takes on integer values from 0 to 23 or from 1 to 24.

Numerous other time-based arrangements can be used. For example, it is possible to use finer or coarser time granularity in establishing the time bins. Additionally or alternatively, it is possible in a given embodiment to use non-uniform arrangements of time bins of different granularities.

The likelihood statistics in some embodiments comprise respective two-way log likelihood ratios. For example, a given one of the likelihood statistics $T_i$ for hourly time bin i may be expressed as follows:

$$T_i = S_i \log S_i - (S_i+1)\log(S_i+1) + (S+1)\log(S+1) - S^* \log S,$$

where $S = \Sigma_i S_i$ denotes the total number of login events for the given user identifier. Additional details regarding this likelihood statistic and others that may be used in illustrative embodiments will be described below.

This particular likelihood statistic is also referred to herein as a time of day anomaly statistic, and is denoted herein in conjunction with some embodiments as $T_x$ or simply as T. It provides a robust statistic for use in detecting time-based anomalies such as login events that occur at unusual hours relative to a login profile previously established for the corresponding user identifier. Once the login profile is established in the manner mentioned above, the likelihood of a new login event can be determined using likelihood statistics based on these exemplary two-way log likelihood ratios.

An advantage of this particular time of day anomaly statistic is that the value of the statistic monotonically increases with an increasing number of login events within the login profile. Accordingly, the confidence in the statistic as applied to a new login event increases with the number of login events already within the login profile. If the user only has one login event in the login profile, the confidence in the statistic as determined for a new login event is very small. However, as the number of events increase, the confidence in the statistic as determined for a new event also increases. The likelihood statistic described above therefore has the property that its confidence increases with sample size. It is to be appreciated, however, that these and other likelihood statistics described herein are presented by way of example only, and other types of likelihood statistics can be used in other embodiments.

In step 204, a confidence measure is generated for a given additional login event for a particular user identifier based on one or more of the likelihood statistics and a time bin of the given additional login event.

As indicated previously, the confidence measure is illustratively configured to increase as a function of total number of login events utilized to generate the login profile. For example, the confidence measure may comprise a p-value determined at least in part by summing probabilities from the login profile for respective ones of the likelihood statistics that are less than or equal to the likelihood statistic of the time bin of the given additional login event.

More particularly, the p-value can be determined using probabilities of login events occurring in respective ones of the time bins. For example, probability $p_i$ of a login event occurring in hourly time bin i can be computed as $p_i = S_i/S$, where $S = \Sigma_i S_i$ denotes the total number of login events.

Alternatively, probability $p_i$ of a login event occurring in hourly time bin i can be computed as $p_i = (S_i + \lambda)/(S + 24^*\lambda)$, where $S = \Sigma_i S_i$ again denotes the total number of login events and $\lambda$ is a smoothing factor.

Using probabilities of the type described above, the p-value can be computed as $$pval = \sum_{\substack{i \\ where\ T_i \geq T_{obs}}} p_i,$$

where $T_i$ denotes the likelihood statistic for hourly time bin i and $T_{obs}$ denotes the likelihood statistic for the given additional login event. As another example, the p-value can be computed as $$pval = \sum_{\substack{i \\ where\ Si < Sx}} p_i,$$

where $S_x$ denotes the number of login events for hourly time bin x associated with the given additional login event. Again, these are only examples, and alternative confidence measures, including confidence measures not necessarily based on p-values, can be used in other embodiments.

It should also be noted in this regard that the probabilities used to determine the confidence measure need not be computed on a strictly per-bin basis. For example, in other embodiments, probabilities associated with respective ones of the time bins are each averaged over one or more neighboring ones of the time bins. As another example, the time bin associated with the given additional login event can be expanded to include login events from one or more neighboring ones of the time bins.

In step 206, the confidence measure is compared to a threshold and an alert is generated for the given additional login event based on a result of comparing the confidence measure to the threshold. For example, the alert may be generated if the confidence measure exceeds the threshold.

The processing of the given additional login event to generate the alert can be performed in some embodiments in real time, responsive to the occurrence of the login event within the computer network. Alternatively, the given additional login event can be processed as part of a batch of additional login events retrieved from the authentication logs database 106 at one of a plurality of periodic processing intervals. The network security system 105 can therefore be configured to support a real-time processing mode of operation, a batch processing mode of operation, or combinations of real-time processing, batch processing or other types of processing modes.

In step 208, the alert is provided to a security agent and one or more automated remedial actions are taken in the network security system. For example, the alert may be transmitted over the network 104 to one of the security agent devices 110. The automated remedial actions can illustratively include, for example, requiring one or more additional authentication factors from a given one of the user devices 102 that is determined to be associated with an anomalous login event.

In step 210, the login profiles for respective ones of the user identifiers are updated. For example, the profiles can be continuously or periodically tuned based on additional login events that occur within the computer network.

Additional instances of steps 200 through 210 can be performed responsive to occurrence of login events or otherwise repeated periodically in order to ensure that time-based anomalies are accurately and efficiently detected within the computer network 100.

Numerous other techniques can be used in association with detection of time-based access anomalies through processing of data characterizing login events. For example, alternative processes can include other types and arrangements of automated remedial actions in response to a detected time-based access anomaly.

Figure 2:
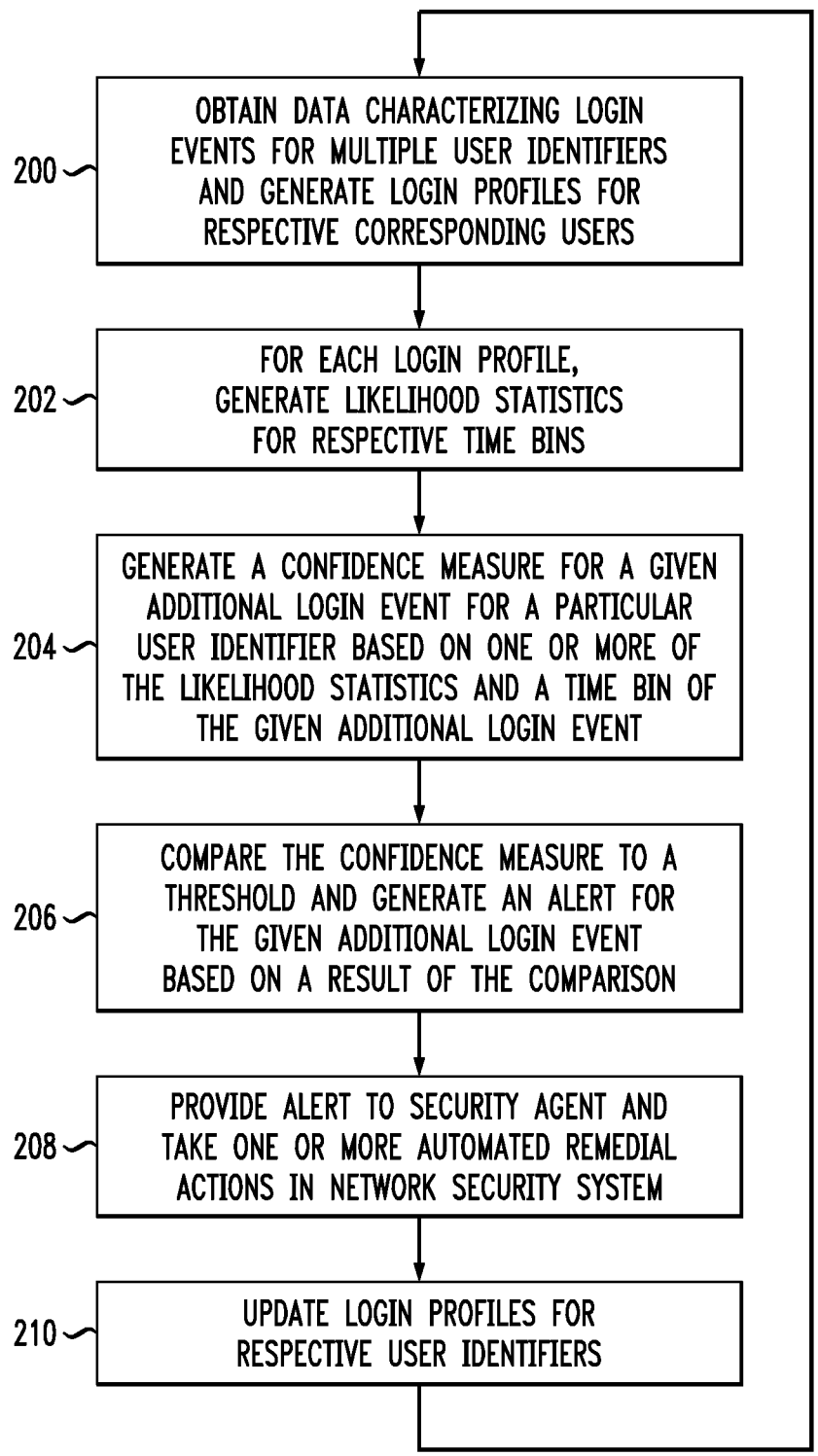
FIG. 2 is a flow diagram of a process for automated detection of time-based access anomalies in an illustrative embodiment.

Accordingly, the particular processing operations and other network functionality described in conjunction with the flow diagram of FIG. 2 are presented by way of illustrative example only, and should not be construed as limiting the scope of the invention in any way. Alternative embodiments can use other types of processing operations to detect time-based access anomalies and undertake appropriate remediation actions. For example, the ordering of the process steps may be varied in other embodiments, or certain steps may be performed concurrently with one another rather than serially. Also, as indicated previously, the process steps or subsets thereof may be repeated periodically in conjunction with respective distinct instances of time-based anomaly detection.

Additional illustrative embodiments will now be described in detail with reference to FIGS. 3 and 4.

Figure 3:
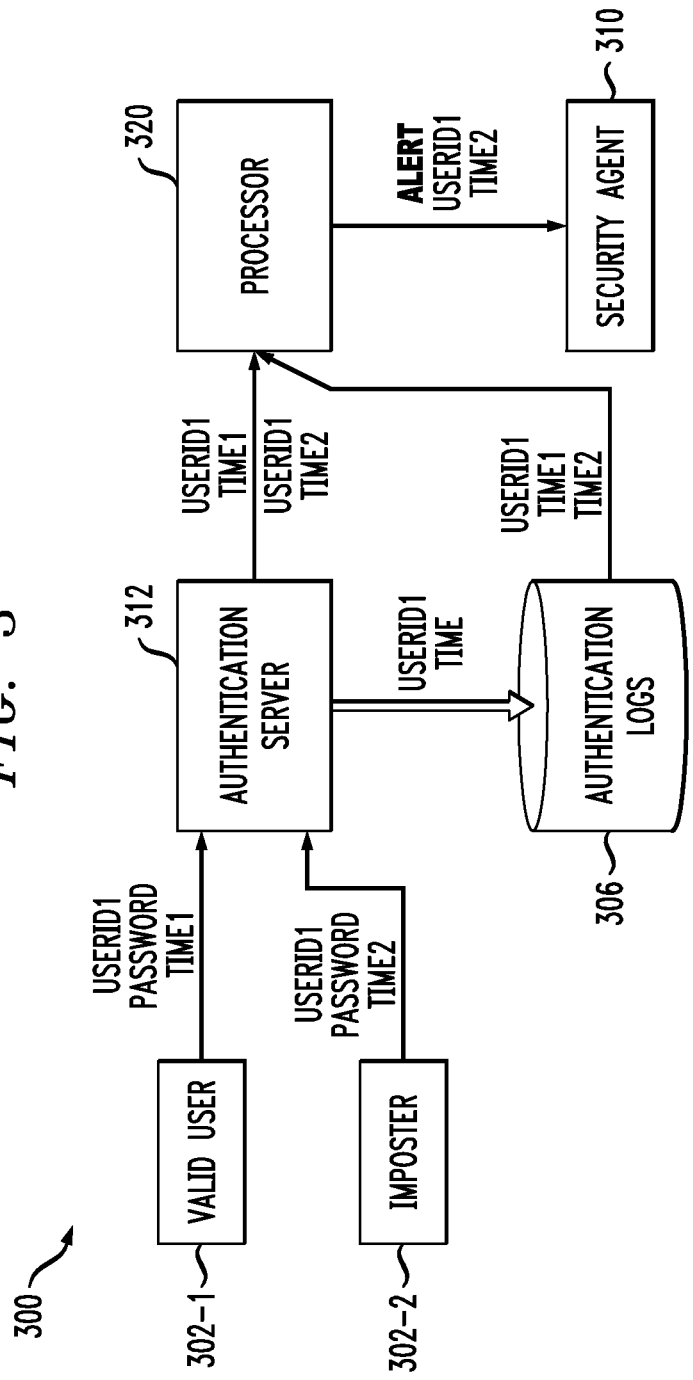
FIG. 3 is a block diagram of a computer network with automated detection of time-based access anomalies in another embodiment.

Referring initially to FIG. 3, a computer network 300 includes functionality for automated detection of time-based access anomalies. The computer network 300 comprises first and second user devices 302-1 and 302-2, an authentication logs database 306, a security agent device 310, an authentication server 312 and a processor 320.

The first user device 302-1 is assumed to be associated with a valid user that logs in at time1 using userid1 and a corresponding password. The second user device 302-2 is assumed to be associated with an imposter that logs in at time2, also using userid1 and the corresponding password. The first and second user devices 302-1 and 302-2 in some attack scenarios may be the same device, as in a scenario in which the user device is stolen from the valid user by the imposter. Both the valid user and the imposter present the appropriate login information to the authentication server 312, which grants access and records the corresponding login events relating to userid1 and their respective access times in the authentication logs database 306. It is assumed that time2 is later in time than time1. It is further assumed that the processor 320 has over an extended period of time developed a login profile for the valid user having userid1 based on previous login events relating to that user identifier.

In a real-time processing mode of operation, the login events are provided to the processor 320 as they occur. The processor 320 generates likelihood statistics based on the login profile, and then generates a confidence measure for the additional login event represented by the login by the imposter at time2. The processor 320 is thereby able to detect the login event involving the imposter, and generates an alert responsive to that login event for delivery to the security agent device 310. The likelihood statistics and the confidence measures can be generated in a manner similar to that described previously in the context of FIG. 2.

In a batch processing mode of operation, the login events are obtained by the processor 320 from the authentication logs database 306. The processor again generates likelihood statistics based on the login profile, and then generates a confidence measure for the additional login event represented by the login by the imposter at time2. Accordingly, the processor is once again able to detect the login event involving the imposter, and generates an alert responsive to that login event for delivery to the security agent device 310.

FIG. 4 shows pseudocode 400 of an example of real-time processing of a given login event in the processor 320 of the computer network 300 of FIG. 3. It is assumed that software program code corresponding to the pseudocode 400 is stored in an associated memory and executed by the processor 320. Portions of the pseudocode 400 implement respective login profile generator, statistics engine and alert generator modules similar to modules 130, 132 and 134 of processor 120 of the FIG. 1 embodiment.

In the pseudocode 400, the time bins are hourly time bins having index i which includes integer values from 1 to 24. The index k in the pseudocode 400 is a timestamp index, where each login event has a unique timestamp, and the login profile is based on a sliding-window history of login events with a maximum number of login events for the sliding-window history being given by the variable "nStamps" denoting the maximum number of timestamps.

Similar pseudocode can be used to implement the batch processing mode of operation of the processor 320. It is to be appreciated, however, that the particular indexing arrangements, time bins, likelihood statistics, confidence measure and threshold used in the pseudocode 400 are presented by way of example only, and can be varied in other embodiments.

Additional details regarding exemplary likelihood statistics suitable for use in the illustrative embodiments of FIGS. 1 through 4 will now be described. As mentioned above, an exemplary statistic in some embodiments comprises a two-way log likelihood ratio. Such a statistic can be characterized in the following manner. Assume the login events for a particular user comprise a sequence of login event times $\{x_S\}$. These events fall within hourly time bins, with $S_i$ being the number of events observed in the hourly bin i. Assume that the index i ranges from 0 to 23, covering the 24 hours of a day. As mentioned previously, the probability of a login event occurring with hourly time bin i can be computed as $S_i/S$, where $S_i$ is the total number of events $S = \Sigma_i S_i$.

Further assume that a set of new login events arrives. The new login events are in the form of another sequence of login event times $\{x_R\}$. As with the previous events, the number of these new events falling into each of the hourly time bins is determined. The number of events observed in the hourly bin i is denoted $R_i$.

The two-way log likelihood ratio is used to determine whether the two sets $\{x_S\}$ and $\{x_R\}$ are drawn from the same distribution or from two different distributions. A multinomial distribution is assumed for the events, although other distributions can be used in other embodiments. The probabilities of the individual distributions are assumed to be given by $S_i/S$ and $R_i/R$. The joint probability is $(S_i+R_i)/(S+R)$. The two-way log likelihood ratio LLR is then given by:

$$LLR = \sum_i R_i \log\left(\frac{R_i/R}{(R_i+S_i)/(R+S)}\right) + S_i \log\left(\frac{S_i/S}{(R_i+S_i)/(R+S)}\right)$$

which can be reduced to the following:

$$LLR = \sum_i R_i \log\frac{R_i}{R} + \sum_i S_i \log\frac{S_i}{S} - \sum_i (R_i+S_i)\log\frac{R_i+S_i}{R+S}$$

In some embodiments, such as the real-time processing mode of FIG. 3 as reflected in the pseudocode 400 of FIG. 4, the set of new login events contains only a single event. The two-way log likelihood ratio is then used to determine if the single new login event, occurring within hourly time bin x, fits the login profile distribution based on the previous set of login events. In this case, the set $\{x_R\}$ contains only one event falling in time bin x, such that $R_x=1$ and $R_{i \neq x}=0$. The LLR becomes:

$$LLR(\text{single event}) = \sum_i S_i \log \frac{S_i}{S} - \sum_i (S_i + \delta_{i,x}) \log \frac{S_i + \delta_{i,x}}{S+1}$$

which reduces to substantially the same equation given previously for the example time of day anomaly statistic, but denoted here as $T_x$, where x denotes the value of the observed hourly bin index i for the single new login event:

$$LLR = T_x = S_x \log S_x - (S_x+1)\log(S_x+1) + (S+1)\log(S+1) - S^*\log S$$

This likelihood statistic $T_x$ ranges from 0 to infinity. A small value of the likelihood statistic $T_x$ tends to indicate that the events in R and S are part of the same distribution. When all login events for both R and S are within the same hourly bin, then $$T_x \xrightarrow[S \to \infty]{} 0.$$

Also, $T_x$ increases with increasing S. Moreover, $T_x$ decreases with increasing $S_x$, being zero for $S_x=S$.

The distribution of the likelihood statistic $T_x$ depends on the distributions of R and S, and also on the total number of events. The likelihood statistic $T_x$ becomes approximately chi-square distributed when there are large numbers of events in both R and S. However, in the case of a single new login event, the distribution should be numerically calculated, as in the pseudocode 400 of FIG. 4. Every user login profile has its own distribution, and the statistics can be compared between differing profiles.

In the present example, it is assumed that R and S are of the same distribution. The set $\{x_R\}$ has only one random variable, in that $R_i$ only has the values either 1 or 0 with respective probabilities $p_x$. The maximum likelihood estimator for these probabilities is $p_i = S_i/S$. However, for $S_i = 0$, the probability is zero. As an alternative to the maximum likelihood estimator, an additive smoothing estimator, $p_i = (S_i + \lambda)/(S + 24^*\lambda)$, may be used. This additive smoothing estimator is used in the pseudocode 400 of FIG. 4, and is also referred to as a Laplace smoothing estimator. The value of the smoothing parameter in the pseudocode 400 is selected between the values of 0.0 and 0.6, as indicated in the corresponding comment portion of the pseudocode.

The $T_i$ statistic has 24 possible values, corresponding to respective ones of the 24 hourly bins i. The probability of observing a corresponding one of these 24 values is $p_i$. The p-value is the probability $P(T \geq T_{obs})$:

$$pval = \sum_{\substack{i \\ \text{where } Ti \geq Tobs}} p_i.$$

The sum is over those hourly bins i whose respective statistics $T_i$ are greater than the statistic $T_{obs}$ of the observed time bin x of the new login event. Since $T_x(S_x)$ monotonically decreases with $S_x$ it is not necessary to explicitly calculate the statistics $T_i$. Instead, the p-value can be computed from $S_x$ directly, as follows:

$$pval = \sum_{\substack{i \\ \text{where } Si < Sx}} p_i.$$

It should be noted that p-values can be computed in a similar manner for other likelihood statistics that are monotonically increasing with $S_x$. Accordingly, it is to be appreciated that embodiments of the invention are not limited to the $T_x$ statistic or variants thereof as described above.

As mentioned previously, in some embodiments the bin sizes are adjusted through various bin averaging mechanisms. Such arrangements can, for example, take into account the fact that a login event during late evening hours is more suspicious than events during normal work hours. Consider a distribution in which there are login events occurring at 8, 9 and 11 in the evening, but no events at 10 in the evening. A new login event occurring at 10 in the evening is less suspicious than an event occurring at 1 in the morning. This can be taken into account through bin averaging. Two approaches to bin averaging are described below. One approach is to average the hourly bin probabilities. The second approach is to expand the bin size for one hourly bin to include events from neighboring hourly bins.

With regard to the averaging probabilities approach, the $T_i$ statistic can be expressed in terms of probabilities as follows:

$$T_i = \sum_i R_i \log\left(\frac{R_i}{R}\right) + \sum_i +S_i \log\left(\frac{S_i}{S}\right) - \sum_i (R_i + S_i)\log\left(\frac{(R_i + S_i)}{(R+S)}\right)$$

$$T_i = R \sum_i r_i \log(r_i) + S \sum_i s_i \log(s_i) - (R+S) \sum_i p_i \log(p_i)$$

where $r_i$, $s_i$ and $p_i$ are the probabilities $$r_i = \frac{R_i}{R}, \; s_i = \frac{S_i}{S}, \; p_i = \frac{R_i + S_i}{R + S}$$

These probabilities can be averaged over neighboring hourly bins as follows:

$$\bar{r_i} = \frac{1}{3}\sum_{j=-1}^{1} r_{i+j}, \; \bar{s_i} = \frac{1}{3}\sum_{j=-1}^{1} s_{i+j}, \; \bar{p_i} = \frac{1}{3}\sum_{j=-1}^{1} p_{i+j}$$

The statistic then becomes $$T_{ap} = R\sum_i \bar{r_i}\log(\bar{r_i}) + S\sum_i \bar{s_i}\log(\bar{s_i}) - (R+S)\sum_i \bar{p_i}\log(\bar{p_i})$$

It should be noted that $\bar{r}_{x-1}=\bar{r}_x=\bar{r}_{x+1}=1/3$ and is zero for all other hourly bins. Other averaging mechanisms based on different numbers and arrangements of hourly time bins can be used. Accordingly, the particular smoothing kernels used to compute the average probabilities above can be varied in other embodiments.

With regard to the bin size expansion approach, the statistic can be expressed in terms of two bins, one at x, and the second containing all other hours excluding x. The statistic is then given by:

$$LLR = R_x \log\left(\frac{R_x/R}{(R_x+S_x)/(R+S)}\right) + (R-R_x)\log\left(\frac{(R-R_x)/R}{(R-R_x+S-S_x)/(R+S)}\right) + S_x \log\left(\frac{S_x/S}{(R_x+S_x)/(R+S)}\right) + (S-S_x)\log\left(\frac{(S-S_x)/S}{(R-R_x+S-S_x)/(R+S)}\right)$$

For a single event, $R_x=1$, $(R-R_x)=0$. The single event LLR is as follows:

$$LLR(\text{single event}) = \log\left(\frac{S+1}{S_x+1}\right) + S_x \log\left(\frac{S_x/S}{(S_x+1)/(S+1)}\right) + (S-S_x)\log\left(\frac{(S-S_x)/S}{(S-S_x)/(S+1)}\right)$$

The bin at hour x is expanded to include login events from neighboring hourly bins. The number of events for the expanded bin is $$S'_x = \sum_{i=-1}^{1} S_{x+i}$$

The T statistic is then calculated using $S'_x$ as follows:

$$T_{ba} = \log\left(\frac{S+1}{S'_x+1}\right) + S_x \log\left(\frac{S'_x/S}{(S_{tx}+1)/(S+1)}\right) + (S-S'_x)\log\left(\frac{(S-S'_x)/S}{(S-S'_x)/(S+1)}\right)$$

Again, the particular likelihood statistics described above are exemplary only, and other alternative likelihood statistics can be used in other embodiments. Accordingly, the parameters, features and other characteristics of these embodiments are illustrative only and should not be construed as limiting in any way.

The above-described illustrative embodiments provide significant advantages relative to conventional approaches. For example, as mentioned previously, the confidence in the likelihood statistic in some embodiments increases with the number of login events that are included in the login profile. Also, if the login profile includes only a single event, the statistic for a new login event in some embodiments has a value of zero or nearly zero. Moreover, when there is a large number of login events in the profile, the statistic will have a large value if a new login event occurs at an abnormal time.

Another advantage of some embodiments is that the likelihood statistic incorporates the number of observed login events for each user, such that resulting statistic values computed for new login events can be accurately compared across users with different login profiles each having different numbers of login events.

It should be emphasized again that the above-described embodiments of the invention are presented for purposes of illustration only. Many variations may be made in the particular arrangements shown. For example, although described in the context of particular network and device configurations, the techniques are applicable to a wide variety of other types of computer networks and processing device configurations. Also, different types and arrangements of network security systems, modules, login profiles, time bins, likelihood statistics, confidence measures, thresholds, alerts and other features can be used in other embodiments. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. A method for automated detection of time-based access anomalies, the method comprising steps of:
   obtaining data characterizing login events for a plurality of user identifiers wherein the login events are associated with respective logins initiated from user devices over at least one network;
   processing the data associated with a given one of the user identifiers to generate a login profile for a corresponding user;
   generating likelihood statistics for respective ones of a plurality of time bins based on the login profile, the login profile comprising login event counts for respective ones of the time bins, with the login event counts indicating for the corresponding user how many login events fall into each of the time bins;
   obtaining data characterizing one or more additional login events for the given user identifier;
   generating a confidence measure for a given one of the additional login events based on one or more of the likelihood statistics and a time bin associated with the given additional login event;
   comparing the confidence measure to a threshold;
   generating an alert relating to the given additional login event based on a result of comparing the confidence measure to the threshold; and
   taking one or more automated remedial actions in a network security system responsive to the generated alert;
   wherein the one or more automated remedial actions comprise altering authentication requirements for a given one of the user devices that is determined to be associated with an anomalous login event;
   wherein generating the confidence measure for the given additional login event comprises determining a probability of a login event occurring during the time bin associated with the given additional login based at least in part on a comparison of the login event count for the time bin associated with the given additional login event with the total number of login events for two or more of the plurality of time bins utilizing a smoothing factor; and
   wherein the steps are performed by at least one processing device comprising a processor coupled to a memory.

2. The method of claim 1 wherein the time bins comprise respective hours of a day.

3. The method of claim 1 wherein the login profile for the given user identifier comprises login event counts $S_i$ denoting the number of login events for hourly time bin i and wherein probability $p_i$ of a login event occurring in hourly time bin i is computed as:

$$p_i=(S_i+\lambda)/(S+24*\lambda),$$

where $S=\Sigma_i S_i$ denotes the total number of login events and $\lambda$ is the smoothing factor.

4. The method of claim 3 wherein a given one of the likelihood statistics $T_i$ for hourly time bin i is given by:

$$T_i=S_i \log S_i-(S_i+1)\log(S_i+1)+(S+1)\log(S+1)-S*\log S.$$

5. The method of claim 3 wherein the confidence measure comprises a p-value computed as one of:

$$pval = \sum_{\substack{i \\ \text{where } Ti \geq Tobs}} p_i, \quad \text{(i)}$$

where $T_i$ denotes the likelihood statistic for hourly time bin i and $T_{obs}$ denotes the likelihood statistic for the given additional login event; and $$pval = \sum_{\substack{i \\ \text{where } Si < Sx}} p_i, \quad \text{(ii)}$$

where $S_x$ denotes the number of login events for hourly time bin x associated with the given additional login event.

6. A method for automated detection of time-based access anomalies, the method comprising steps of:
- obtaining data characterizing login events for a plurality of user identifiers wherein the login events are associated with respective logins initiated from user devices over at least one network;
- processing the data associated with a given one of the user identifiers to generate a login profile for a corresponding user;
- generating likelihood statistics for respective ones of a plurality of time bins based on the login profile, the likelihood statistics comprising respective two-way log likelihood ratios;
- obtaining data characterizing one or more additional login events for the given user identifier;
- generating a confidence measure for a given one of the additional login events based on one or more of the likelihood statistics and a time bin associated with the given additional login event;
- comparing the confidence measure to a threshold;
- generating an alert relating to the given additional login event based on a result of comparing the confidence measure to the threshold; and
- taking one or more automated remedial actions in a network security system responsive to the generated alert;
- wherein the one or more automated remedial actions comprise altering authentication requirements for a given one of the user devices that is determined to be associated with an anomalous login event; and
- wherein the steps are performed by at least one processing device comprising a processor coupled to a memory.

7. The method of claim 6 wherein the confidence measure is configured to increase as a function of total number of login events utilized to generate the login profile.

8. The method of claim 6 wherein the confidence measure comprises a p-value determined at least in part by summing probabilities from the login profile for respective ones of the likelihood statistics that are less than or equal to the likelihood statistic of the time bin of the given additional login event.

9. The method of claim 6 wherein the given additional login event is processed to generate the alert in real time.

10. The method of claim 6 wherein the given additional login event is processed as part of a plurality of additional login events retrieved from a database of authentication logs.

11. The method of claim 6 wherein probabilities associated with respective ones of the time bins are each averaged over one or more neighboring ones of the time bins.

12. The method of claim 6 wherein the time bin associated with the given additional login event is expanded to include login events from one or more neighboring ones of the time bins.

13. The method of claim 6 wherein the one or more automated remedial actions comprise requiring one or more additional authentication factors from the given one of the user devices that is determined to be associated with an anomalous login event.

14. The method of claim 6 wherein the one or more automated remedial actions comprise logging off the given one of the user devices that is determined to be associated with an anomalous login event.

15. A non-transitory processor-readable storage medium having stored therein program code of one or more software programs, wherein the program code when executed by at least one processing device causes said at least one processing device:
- to obtain data characterizing login events for a plurality of user identifiers wherein the login events are associated with respective logins initiated from user devices over at least one network;
- to process the data associated with a given one of the user identifiers to generate a login profile for a corresponding user;
- to generate likelihood statistics for respective ones of a plurality of time bins based on the login profile, the login profile comprising login event counts for respective ones of the time bins, with the login event counts indicating for the corresponding user how many login events fall into each of the time bins, the likelihood statistics comprising respective two-way log likelihood ratios;
- to obtain data characterizing one or more additional login events for the given user identifier;
- to generate a confidence measure for a given one of the additional login events based on one or more of the likelihood statistics and a time bin associated with the given additional login event;
- to compare the confidence measure to a threshold;
- to generate an alert relating to the given additional login event based on a result of comparing the confidence measure to the threshold; and
- to take one or more automated remedial actions in a network security system responsive to the generated alert;
- wherein the one or more automated remedial actions comprise altering authentication requirements for a given one of the user devices that is determined to be associated with an anomalous login event.

16. The processor-readable storage medium of claim 15 wherein the confidence measure comprises a p-value determined at least in part by summing probabilities from the login profile for respective ones of the likelihood statistics that are less than or equal to the likelihood statistic of the time bin of the given additional login event.

17. The processor-readable storage medium of claim 15 wherein the one or more automated remedial actions comprise requiring one or more additional authentication factors from the given one of the user devices that is determined to be associated with an anomalous login event.

18. The processor-readable storage medium of claim 15 wherein the one or more automated remedial actions comprise logging off the given one of the user devices that is determined to be associated with an anomalous login event.

19. An apparatus comprising:
   at least one processing device comprising a processor coupled to a memory;
   said at least one processing device being configured:
      to obtain data characterizing login events for a plurality of user identifiers wherein the login events are associated with respective logins initiated from user devices over at least one network;
      to process the data associated with a given one of the user identifiers to generate a login profile for a corresponding user;
      to generate likelihood statistics for respective ones of a plurality of time bins based on the login profile, the login profile comprising login event counts for respective ones of the time bins, with the login event counts indicating for the corresponding user how many login events fall into each of the time bins, the likelihood statistics comprising respective two-way log likelihood ratios;
      to obtain data characterizing one or more additional login events for the given user identifier;
      to generate a confidence measure for a given one of the additional login events based on one or more of the likelihood statistics and a time bin associated with the given additional login event;
      to compare the confidence measure to a threshold; and
      to generate an alert relating to the given additional login event based on a result of comparing the confidence measure to the threshold; and
      to take one or more automated remedial actions in a network security system responsive to the generated alert;
   wherein the one or more automated remedial actions comprise altering authentication requirements for a given one of the user devices that is determined to be associated with an anomalous login event.

20. The apparatus of claim 19 wherein the confidence measure comprises a p-value determined at least in part by summing probabilities from the login profile for respective ones of the likelihood statistics that are less than or equal to the likelihood statistic of the time bin of the given additional login event.

21. The apparatus of claim 19 wherein the one or more automated remedial actions comprise requiring one or more additional authentication factors from the given one of the user devices that is determined to be associated with an anomalous login event.

22. The apparatus of claim 19 wherein the one or more automated remedial actions comprise logging off the given one of the user devices that is determined to be associated with an anomalous login event.

* * * * *